(12) United States Patent
Kinno et al.

(10) Patent No.: US 10,824,873 B2
(45) Date of Patent: Nov. 3, 2020

(54) INFORMATION PROCESSING APPARATUS, CONTROL METHOD, AND PROGRAM

(71) Applicant: NEC Corporation, Tokyo (JP)

(72) Inventors: Dai Kinno, Tokyo (JP); Kota Iwamoto, Tokyo (JP); Shinichi Matsumoto, Tokyo (JP); Yoshihiro Itou, Tokyo (JP); Shinya Yamasaki, Tokyo (JP); Kanako Taga, Tokyo (JP)

(73) Assignee: NEC Corporation, Tokyo (JP)

( * ) Notice: Subject to any disclaimer, the term of this patent is extended or adjusted under 35 U.S.C. 154(b) by 75 days.

(21) Appl. No.: 16/071,010

(22) PCT Filed: Dec. 14, 2016

(86) PCT No.: PCT/JP2016/087281
§ 371 (c)(1),
(2) Date: Jul. 18, 2018

(87) PCT Pub. No.: WO2017/126256
PCT Pub. Date: Jul. 27, 2017

(65) Prior Publication Data
US 2019/0026562 A1   Jan. 24, 2019

(30) Foreign Application Priority Data
Jan. 21, 2016 (JP) ................... 2016-009749

(51) Int. Cl.
*G06K 9/00* (2006.01)
*G07G 1/00* (2006.01)
(Continued)

(52) U.S. Cl.
CPC ..... *G06K 9/00744* (2013.01); *G06K 9/00624* (2013.01); *G06K 9/6215* (2013.01);
(Continued)

(58) Field of Classification Search
CPC ............ G06K 9/00624; G06K 9/6215; G06K 9/00744; G06K 9/183; G06Q 20/208;
(Continued)

(56) References Cited

U.S. PATENT DOCUMENTS

| 2014/0023241 A1 | 1/2014 | Sugasawa et al. |
| 2015/0193759 A1* | 7/2015 | Fukuda ................ G06K 9/3241 705/23 |
| 2016/0086148 A1* | 3/2016 | Katsumura .......... G06Q 20/208 705/23 |

FOREIGN PATENT DOCUMENTS

| JP | 2004-127013 A | 4/2004 |
| JP | 2013-041465 A | 2/2013 |

(Continued)

OTHER PUBLICATIONS

International Search Report corresponding to PCT/JP2016/087281 dated Mar. 14, 2017 (one page).

(Continued)

*Primary Examiner* — Brenda C Bernardi
(74) *Attorney, Agent, or Firm* — Wilmer Cutler Pickering Hale and Dorr LLP

(57) ABSTRACT

A product registration apparatus (20) includes a comparison unit (22) and a registration unit (24). The comparison unit (22) compares a first frame and a second frame of a video. The second frame is generated at a time later than the first frame. The comparison unit (22) determines a product that is not included in the first frame but included in the second frame. Then, the registration unit (24) registers the determined product (product that is not included in the first frame but included in the second frame) as a payment target.

13 Claims, 15 Drawing Sheets

(51) Int. Cl.
    *G06K 9/62*          (2006.01)
    *G07G 1/12*          (2006.01)
    *G06Q 20/20*        (2012.01)
    *G06K 9/18*          (2006.01)

(52) U.S. Cl.
    CPC ............. *G06Q 20/208* (2013.01); *G07G 1/00* (2013.01); *G07G 1/0018* (2013.01); *G07G 1/0036* (2013.01); *G07G 1/12* (2013.01); *G06K 9/183* (2013.01)

(58) Field of Classification Search
    CPC .......... G07G 1/00; G07G 1/12; G07G 1/0018; G07G 1/0036
    See application file for complete search history.

(56) References Cited

FOREIGN PATENT DOCUMENTS

| | | |
|---|---|---|
| JP | 2013-054673 A | 3/2013 |
| JP | 2014-21915 A | 2/2014 |
| JP | 2014-52805 A | 3/2014 |
| WO | WO-2015/147333 A1 | 10/2015 |

OTHER PUBLICATIONS

Japanese Notice of Reasons for Refusal issued in Japanese Patent Application No. 2017-562473, dated Jul. 28, 2020, 3 pages.

\* cited by examiner

| PAYMENT INFORMATION ID | PRODUCT LIST | | |
|---|---|---|---|
| | PRODUCT ID (306) | PRODUCT ID (304) | ... |
| U0001 | I001 | I003 | ... |

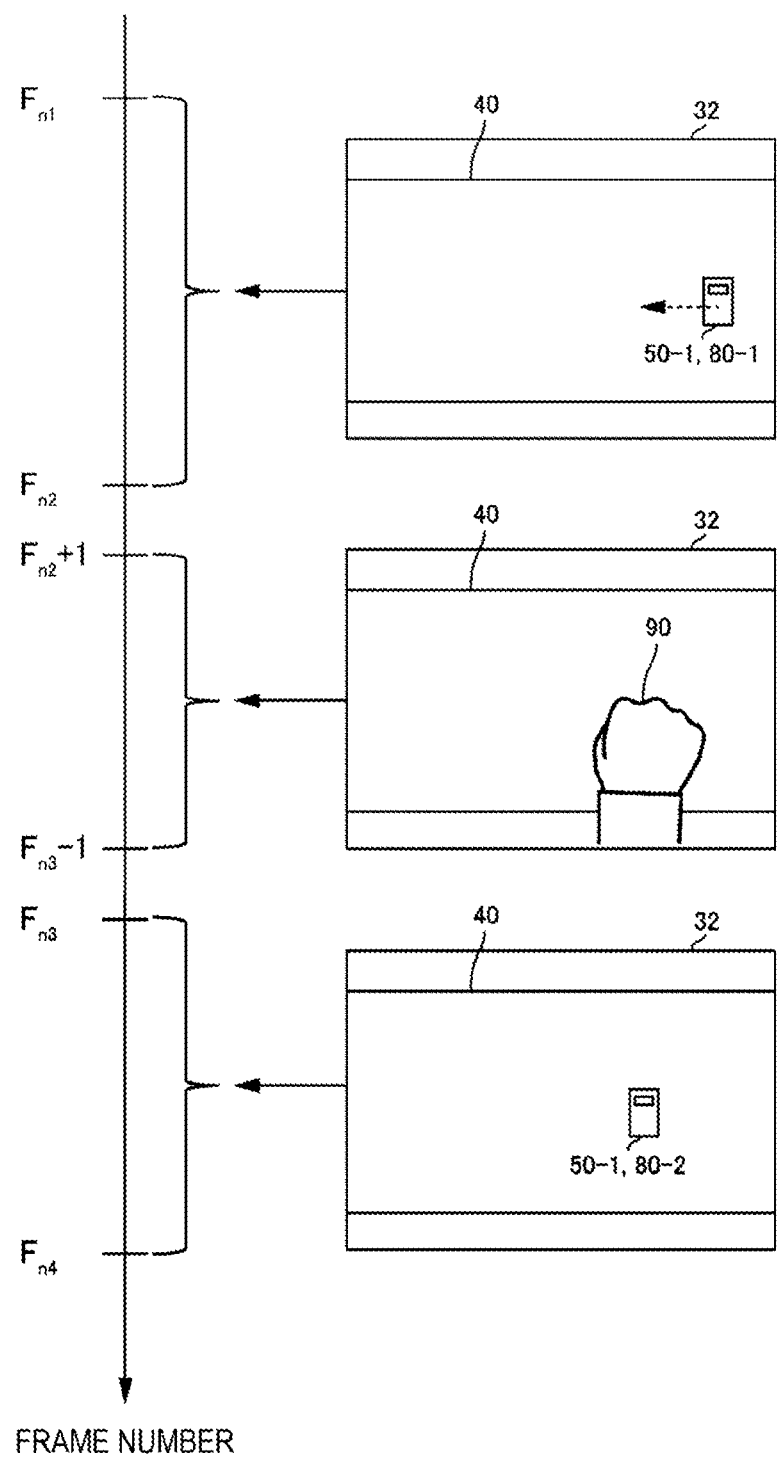

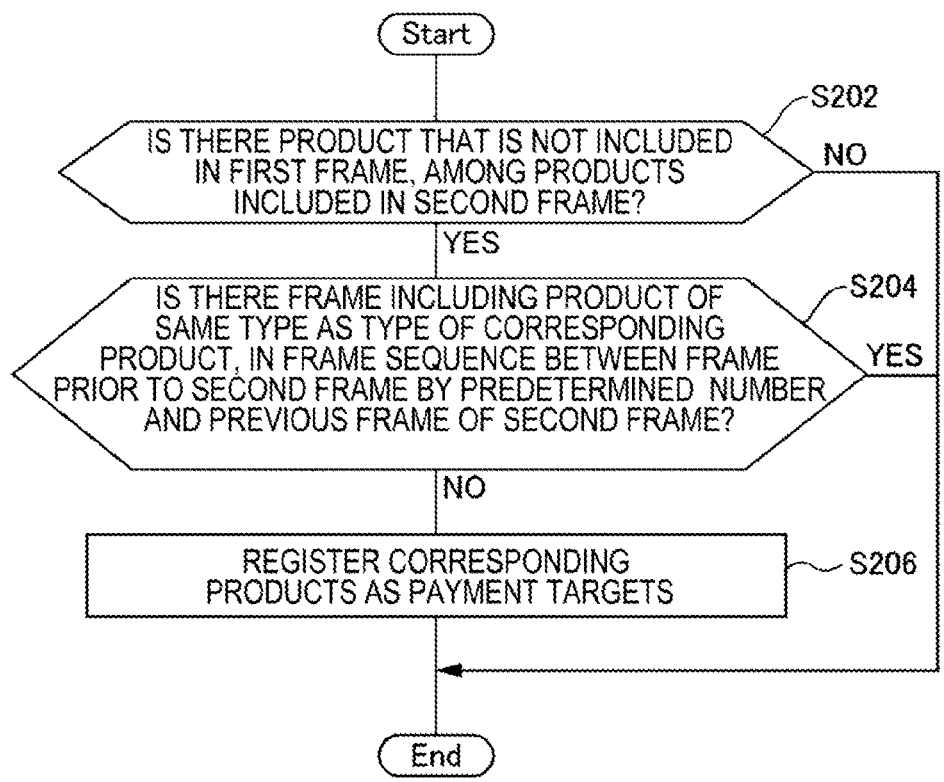

INFORMATION PROCESSING APPARATUS, CONTROL METHOD, AND PROGRAM

CROSS-REFERENCE TO RELATED APPLICATIONS

This application is a national stage application of International Application No. PCT/JP2016/087281 entitled "Information Processing Apparatus, Control Method, and Program" filed on Dec. 14, 2016, which claims priority to Japanese Patent Application No. 2016-009749 filed on Jan. 21, 2016, the disclosures of which are hereby incorporated by reference in their entirety.

TECHNICAL FIELD

The present invention relates to an apparatus used for payment for products.

BACKGROUND ART

In a product registration apparatus (for example, a point of sales (POS) register) in a store such as a supermarket, a process of registering a product as a payment target is performed. For example, such a process is performed by causing a barcode reader or the like provided in the product registration apparatus to read a barcode or the like attached to the product.

Techniques for efficiently operating the product registration apparatus have been developed. For example, Patent Document 1 discloses a technique for collectively registering a plurality of products as payment targets, by imaging the plurality of products placed on a placement table from different directions by a plurality of cameras.

RELATED DOCUMENT

Patent Document

[Patent Document 1] Japanese Patent Application Publication No. 2013-054673

SUMMARY OF THE INVENTION

Technical Problem

In the invention of Patent Document 1, the products are collectively registered as payment targets by imaging the products after all the products are placed on the placement table. Therefore, even if some products are placed on the placement table, the products placed on the placement table cannot be registered as payment targets until the remaining products are placed on the placement table.

The present invention has been made in view of the above problem. An object of the present invention is to provide a technique of improving the efficiency of work of registering a product as a payment target.

Solution to Problem

An information processing apparatus of the present invention includes: 1) a comparison unit which compares a first frame of a video with a second frame to determine a product that is not included in the first frame but included in the second frame, the second frame being generated at a time later than the first frame in the video; and 2) a registration unit which registers the determined product as a payment target.

A control method of the present invention is executed by a computer. The control method includes: 1) a comparison step of comparing a first frame of a video with a second frame to determine a product that is not included in the first frame but is included in the second frame, the second frame being generated at a time later than the first frame in the video; and 2) a registration step of registering the determined product as a payment target.

A program of the present invention causes a computer to execute each step of the control method of the present invention.

Advantageous Effects of Invention

According to the present invention, there is provided a technique of improving the efficiency of work of registering a product as a payment target.

BRIEF DESCRIPTION OF THE DRAWINGS

The foregoing and other objects, features and advantages will become more apparent from the following description of preferred example embodiments and the accompanying drawings.

FIG. 10 is a diagram illustrating payment information in a table format.

FIG. 14 is a diagram illustrating a case where products represented by two objects are the same product.

FIG. 15 is a flowchart illustrating the flow of processes executed by the product registration apparatus of Example Embodiment 2.

DESCRIPTION OF EMBODIMENTS

Figure 1:
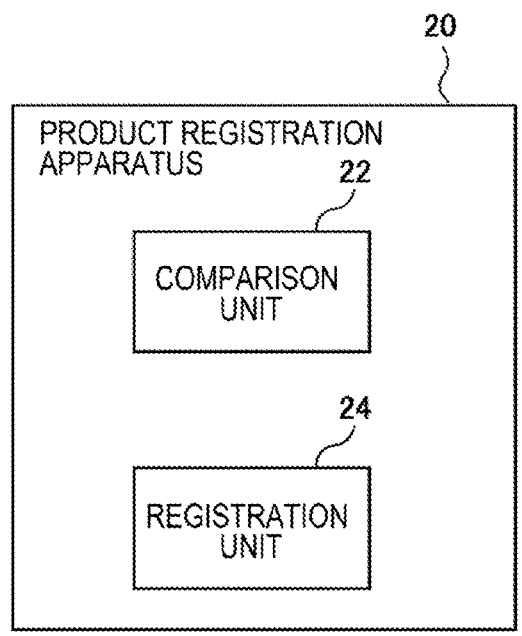
FIG. 1 is a block diagram illustrating a product registration apparatus according to Example Embodiment 1.

Hereinafter, embodiments of the present invention will be described with reference to the drawings. In all the drawings, the same components are denoted by the same reference numerals, and the description thereof will not appropriately be repeated. In each of the block diagrams, unless otherwise specified, each block represents a functional unit configuration, instead of a hardware unit configuration.

Example Embodiment 1

FIG. 1 is a block diagram illustrating a product registration apparatus 20 according to Example Embodiment 1. The product registration apparatus 20 is used in a process of registering a product as a payment target (hereinafter, referred to as a product registration process). The user (store clerk, customer, or the like) of the product registration apparatus 20 operates the product registration apparatus 20 and performs a product registration process for each product purchased by the customer.

To do so, the product registration apparatus 20 includes a comparison unit 22 and a registration unit 24. The comparison unit 22 compares a first frame with a second frame of a video (hereinafter referred to as a product video) that is generated by the camera. The second frame is generated at a time later than the first frame. The comparison unit 22 determines a product that is not included in the first frame but included in the second frame. Then, the registration unit 24 registers the determined product (product that is not included in the first frame but included in the second frame) as a payment target.

According to the product registration apparatus 20 of the present example embodiment, when a new product is included in the product video, the product is registered as a payment target. Therefore, only by putting the product in the imaging range of the camera, the product registration apparatus 20 can register the product as a payment target. Therefore, it is possible to easily perform the product registration process.

Further, according to the product registration apparatus 20 of the present example embodiment, in a case of registering a plurality of products as payment targets, the products that is put into the imaging range are registered as payment targets, without waiting for that all products are put into the imaging range of the camera (for example, placed on the placement table). Therefore, the efficiency of the product registration process is improved.

For example, it is assumed that two people, store clerks A and B, perform product registration work. The store clerk A takes out the product from the shopping basket and places it on the placement table. The store clerk B puts the products registered as a payment target by the product registration apparatus 20 into a bag. Here, by using the product registration apparatus 20 of the present example embodiment, the store clerk B can put the products registered as payment targets into a bag, without waiting for all the products to be placed on the placement table. Therefore, it is possible to shorten the time required for the entire registration work, as compared with the case where it is necessary to wait for all products to be placed on the placement table.

Hereinafter, the present example embodiment will be described in more detail.

<Example of Hardware Realizing Product Registration Apparatus 20>

Each functional configuration unit of the product registration apparatus 20 may be realized by hardware (for example, a hard-wired electronic circuit) that realizes each functional configuration unit, or a combination of hardware and software (for example, a combination of an electronic circuit, a program for controlling the electronic circuit, and the like).

Figure 2:
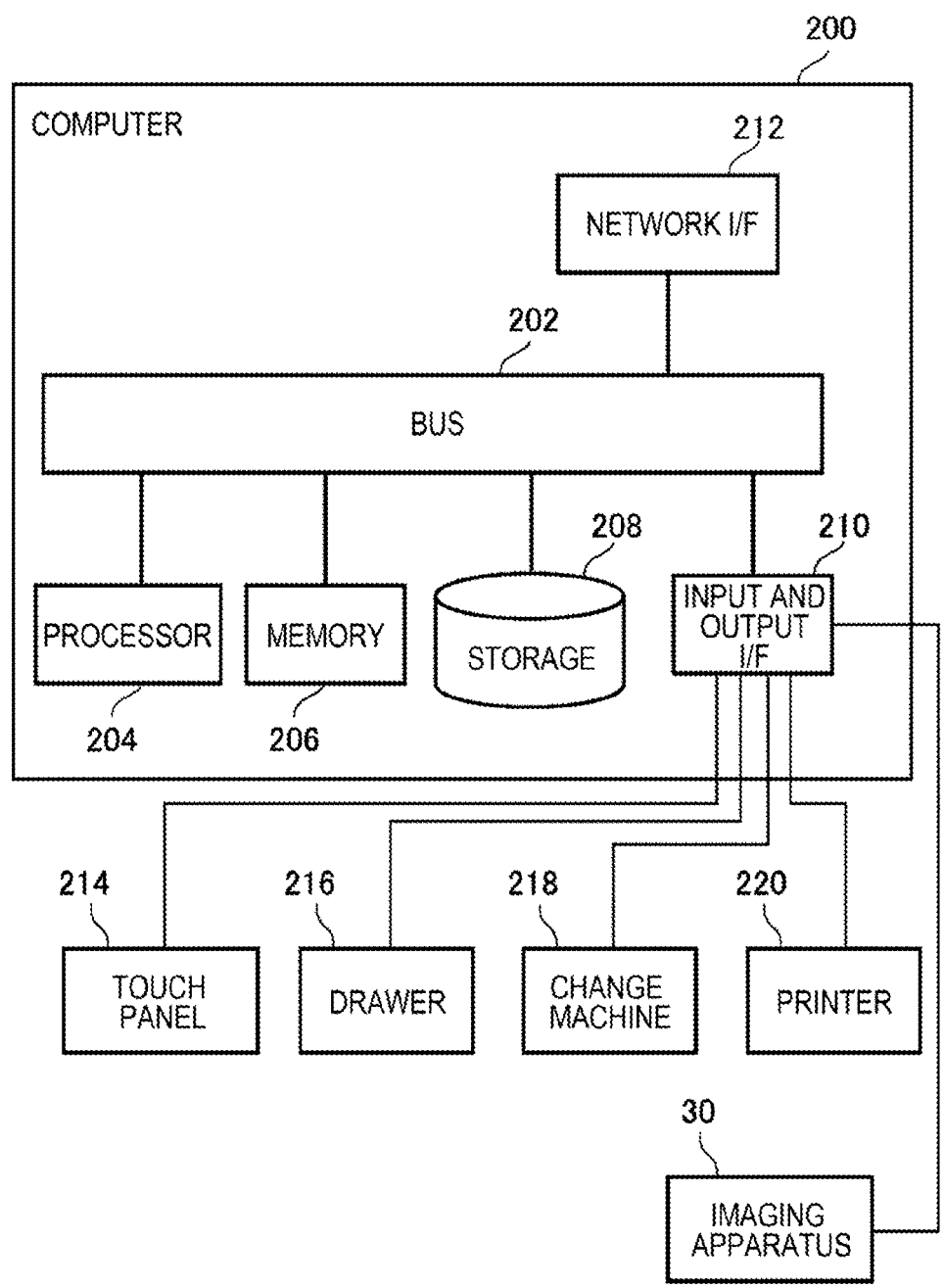
FIG. 2 is a diagram illustrating a hardware configuration of a computer that implements the product registration apparatus of Example Embodiment 1.

FIG. 2 is a diagram illustrating a hardware configuration of a computer 200 that implements the product registration apparatus 20 of Example Embodiment 1. The computer 200 may be implemented using a special-purpose apparatus designed for cash register terminal or may be implemented using a general-purpose apparatus such as a personal computer (PC) or a portable terminal.

The computer 200 includes a bus 202, a processor 204, a memory 206, a storage 208, an input and output interface 210, and a network interface 212. The bus 202 is a data transmission path through which the processor 204, the memory 206, the storage 208, the input and output interface 210, and the network interface 212 mutually transmit and receive data. However, a method of connecting the processor 204 and the like to each other is not limited to bus connection. The processor 204 is an arithmetic processing apparatus such as a central processing unit (CPU) or a graphics processing unit (GPU). The memory 206 is a memory such as a random access memory (RAM) or a read only memory (ROM). The storage 208 is a storage apparatus such as a hard disk, a solid state drive (SSD), or a memory card. Further, the storage 208 may be a memory such as a RAM or a ROM.

The input and output interface 210 is an interface for connecting the computer 200 and an input/output device. For example, a touch panel 214, a drawer 216, a change machine 218, a receipt printer 220, and the like are connected to the input and output interface 210. The touch panel 214 is used, for example, to manually input the amount of money of a product. Further, the touch panel 214 displays various types of information, such as information on a product registered as a payment target. The drawer 216 stores coins and bills. The change machine 218 has an input port for inputting the money and an output port for discharging the change. The receipt printer 220 issues a receipt or the like. An input interface other than the touch panel 214, such as a keyboard, may be connected to the computer 200.

The network interface 212 is an interface for communicably connecting the computer 200 to an external apparatus. The network interface 212 may be a network interface for connection with a wired line, or a network interface for connection with a wireless line. For example, the computer 200 that realizes the product registration apparatus 20 is connected to a store server or the like that manages various apparatuses installed in the store through the network.

The storage 208 stores a program module for implementing each of the functions of the product registration apparatus 20. By executing these respective program modules, the processor 204 implements each of the functions corresponding to the program modules. Here, when executing each of the above modules, the processor 204 may execute the modules after reading them into the memory 206, or may execute the modules without reading them into the memory 206.

The hardware configuration of the computer 200 is not limited to the configuration illustrated in FIG. 2. For example, each program module may be stored in the memory 206. In this case, the computer 200 may not include the storage 208.

In addition, the computer 200 does not necessarily need to be communicably connected to other apparatuses through a network. Therefore, the computer 200 may not include the network interface 212.

Further, in a case where the computer 200 is not used for a payment process, the computer 200 may not include the drawer 216, the change machine 218, and the receipt printer 220.

«Details of Camera 30»

The camera 30 is any camera that can image surroundings and generate a moving image. Note that, the camera 30 may be provided in a housing dedicated to the camera or may be provided integrally with another apparatus (such as a camera incorporated in a smartphone).

Figure 3:
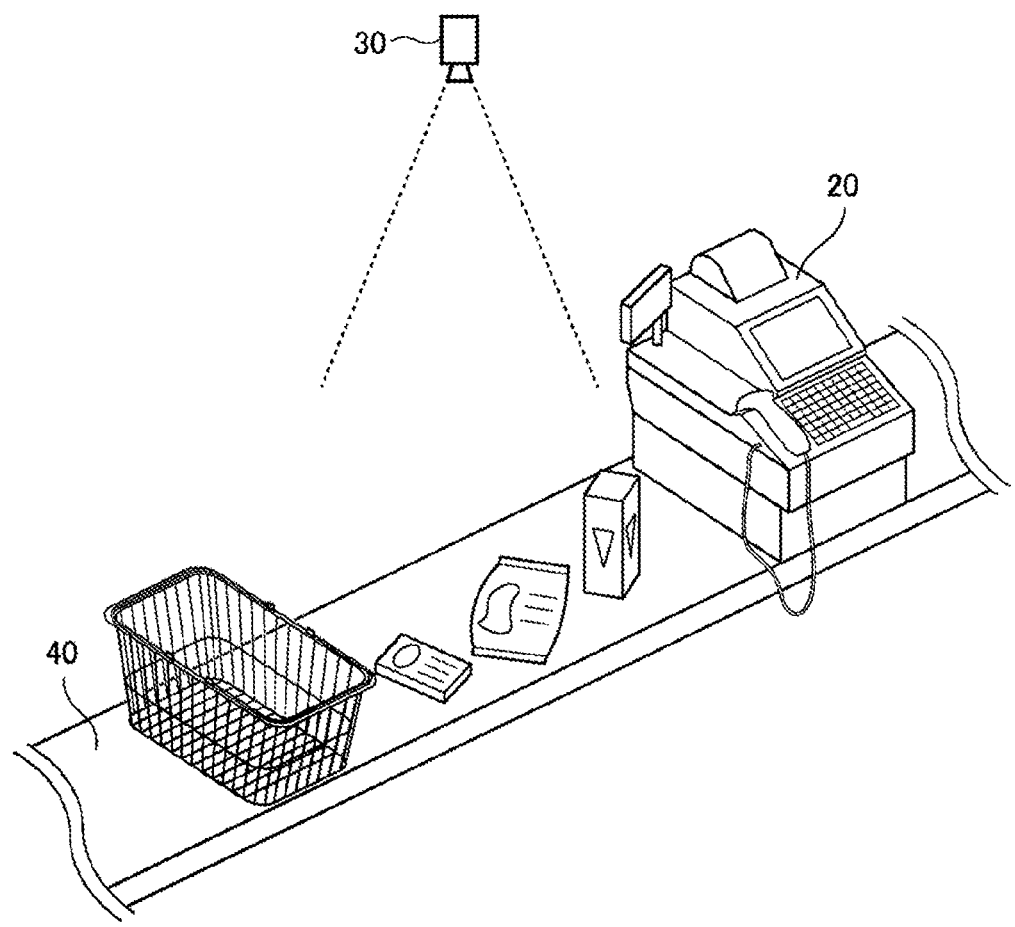
FIG. 3 is a diagram illustrating an installation location of a camera.

The installation location of the camera 30 may be any location capable of imaging the product. For example, the camera 30 is fixed at a position where the placement table is looked down on directly below, the placement table being used when the store clerk registers the product being a payment target. FIG. 3 is a diagram illustrating an installation location of the camera 30. In FIG. 3, the camera 30 looks down on the placement table 40 on which the product is placed. However, the installation position of the camera 30 is not limited to the position shown in FIG. 3.

<Flow of Processes>

Figure 4:
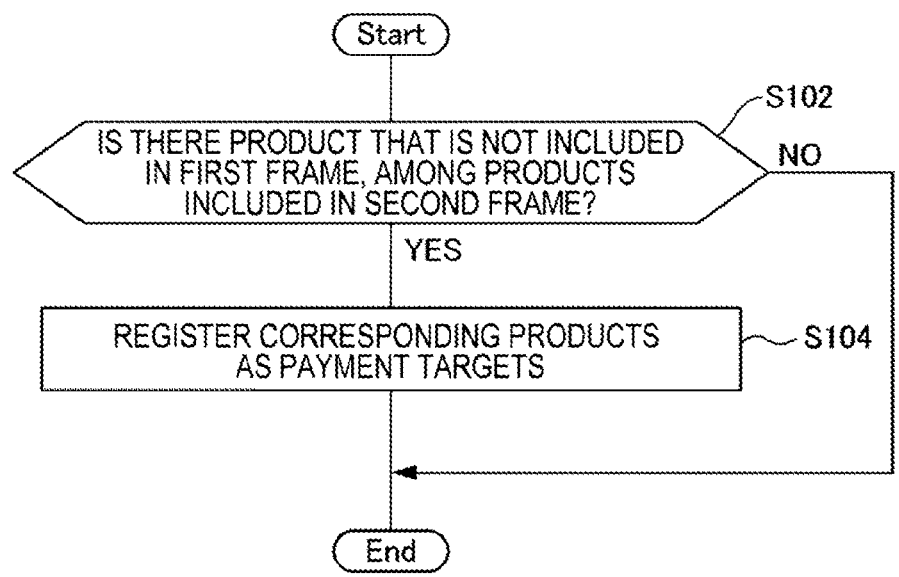
FIG. 4 is a flowchart illustrating the flow of processes executed by the product registration apparatus of Example Embodiment 1.

FIG. 4 is a flowchart illustrating the flow of processes executed by the product registration apparatus 20 of example embodiment 1. The comparison unit 22 determines whether or not there is a product that is not included in the first frame, among the products included in the second frame (S102). If there is a product that is not included in the first frame, among the products included in the second frame (S102: YES), the registration unit 24 registers the corresponding products as payment targets (S104). If there is no product that is not included in the first frame, among the products included in the second frame (S102: NO), the process of FIG. 4 ends.

<Method of Acquiring Product Video>

Any method is used for the product registration apparatus 20 to acquire the product video. For example, the product registration apparatus 20 acquires a product video from the camera 30. In this case, the product registration apparatus 20 is connected to the camera 30 so as to be communicable.

Further, for example, in a case where the camera 30 stores the product video in an external storage apparatus, the product registration apparatus 20 may acquire the product video from the storage apparatus. In this case, the product registration apparatus 20 is connected to the storage apparatus so as to be communicable.

The product registration apparatus 20 may always acquire product videos or may acquire them for a specific period of time. In the latter case, for example, the product registration apparatus 20 starts acquiring the product video at the timing of starting the product registration process, and ends acquiring the product video at the timing of ending the product registration process. The product registration process is started or ended, for example, when the user performs a predetermined input operation on the product registration apparatus 20.

<Method of Comparing Frames>

The comparison unit 22 compares the first frame with the second frame to determine a product that is not included in the first frame, among the products included in the second frame (S102). The method will be specifically described below.

Figure 5A:
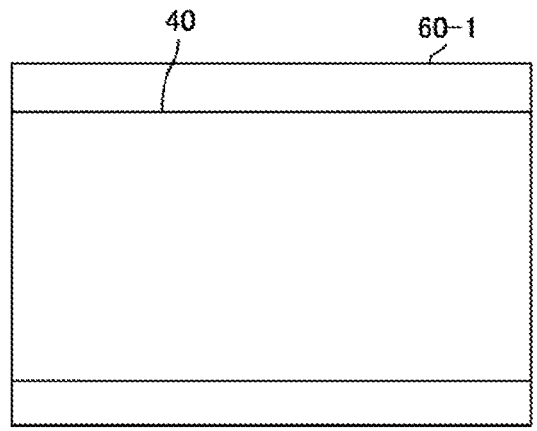
FIG. 5 is a first diagram illustrating a first frame and a second frame.
Figure 5B:
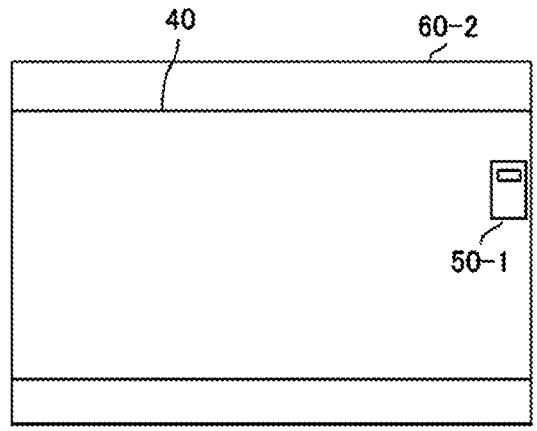

FIG. 5 is the first diagram illustrating the first frame and the second frame. A frame 60-1 represents the first frame and a frame 60-2 represents the second frame. Each frame is generated by the camera 30 fixed so as to look down on the placement table 40 from directly above. In the example shown in FIG. 5, the shopping basket containing the product to be registered as the payment target is placed outside the right side of the imaging range of the camera 30 in a case where the placement table 40 is viewed in plan. The user (store clerk, customer, or the like) of the product registration apparatus 20 takes out the product from the shopping basket, moves the product from right to left, and places it on the placement table 40.

In FIG. 5, the product is not included in the frame 60-1. Thereafter, as a result of the user taking out and moving the product 50-1 from the shopping basket, the product 50-1 is included in the frame 60-2. Therefore, the comparison unit 22 determines the product 50-1 as a product that is included in the frame 60-2 but not included in the frame 60-1. As a result, the registration unit 24 registers the product 50-1 as a payment target.

Figure 6A:
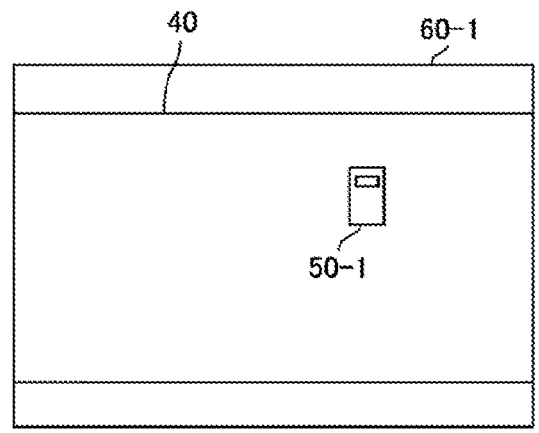
FIG. 6 is a second diagram illustrating a first frame and a second frame.
Figure 6B:
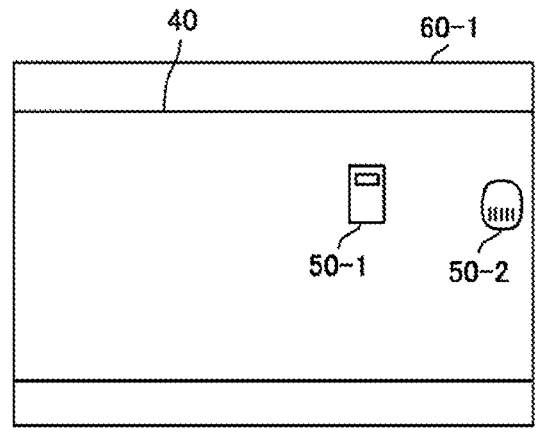

FIG. 6 is the second diagram illustrating the first frame and the second frame. Each frame in FIG. 6 is generated after the frame 60-2 in FIG. 5. Therefore, in FIG. 6, the product 50-1 has already been placed on the placement table 40. Therefore, the product 50-1 is included in the frame 60-1.

Thereafter, as a result of the user taking out and moving the product 50-2 from the shopping basket, the frame 60-2 includes not only the product 50-1 but also the product 50-2. Therefore, the comparison unit 22 determines the product 50-2 as a product that is included in the frame 60-2 but not included in the frame 60-1. As a result, the registration unit 24 registers the product 50-2 as a payment target.

In the example of FIG. 6, the product 50-1 is also included in the frame 60-1. Therefore, according to the result of the comparison between the frames shown in FIG. 6, the product 50-1 is not registered as a payment target. In this case, the product 50-1 has already been registered as s a payment target at the timing when the product 50-1 is moved to be placed on the placement table 40 (for example, at the timing when the frames 60-1 and 60-2 in FIG. 5 are compared by the comparison unit 22).

«Method of Distinguishing Products»

In order to compare the products included in two frames, the comparison unit 22 needs to distinguish between the products included in the respective frames. Hereinafter, a method by which the comparison unit 22 distinguishes between products will be exemplified.

«Method 1»

For example, the comparison unit 22 holds in advance the captured image generated by the camera 30 in a state where the product is not included in the imaging range, as a reference image. Then, the comparison unit 22 extracts a difference between the first frame and the reference image, thereby extracting an object not included in the reference image from the first frame. Then, each extracted object is handled as a product. The comparison unit 22 performs the same process on the second frame.

Next, the comparison unit 22 performs matching between the object extracted from the first frame and the object extracted from the second frame. More specifically, the comparison unit 22 compares the feature value of each object extracted from the first frame with the feature value of each object extracted from the second frame, and handles the objects having the high degree of matching of the feature values (high similarity), as the same objects. Then, the comparison unit 22 handles an object that does not match any object extracted from the first frame (an object having low similarity with any object extracted from the first frame), among the objects extracted from the second frame, as the product that is included in the second frame but not included in the first frame. Note that, the feature value of an object is information indicating features such as the shape, color, and pattern of the object.

Figure 7A:
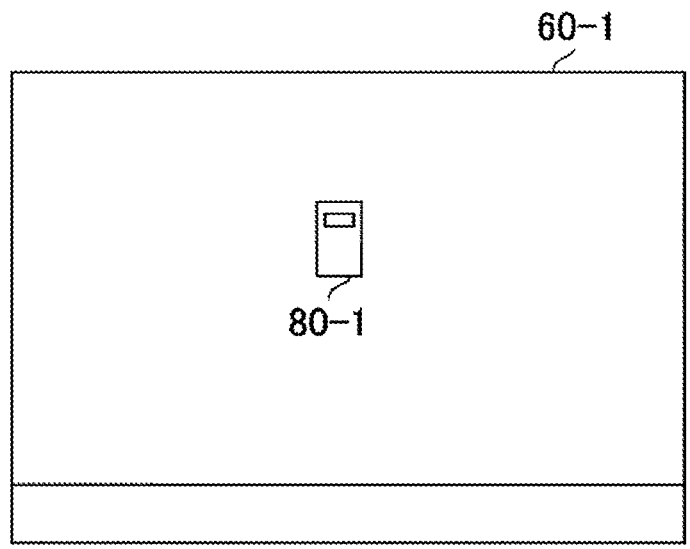
FIG. 7 is a diagram illustrating a scene in which matching of objects is performed.
Figure 7B:
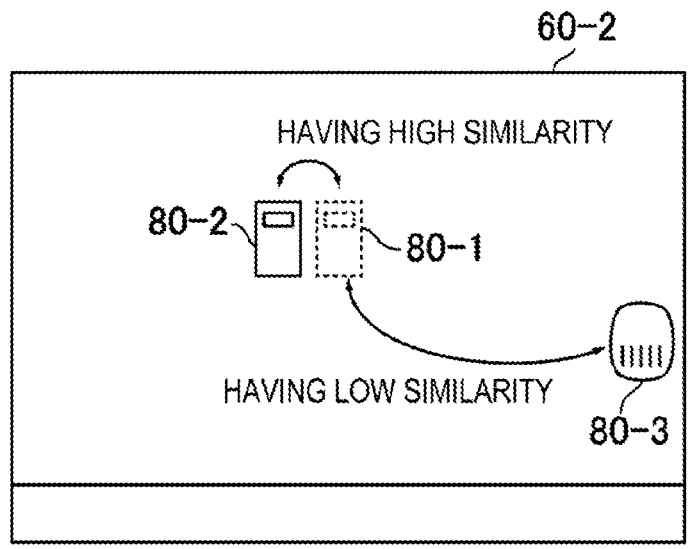

FIG. 7 is a diagram illustrating a state of performing matching of objects. In FIG. 7, an object 80-1 is included in the frame 60-1. On the other hand, an object 80-2 and an object 80-3 are included in the frame 60-2. Here, the shape of the object 80-1 has a high similarity with the shape of the object 80-2, but it has low similarity with the shape of the object 80-3. Therefore, the comparison unit 22 determines that the object 80-1 and the object 80-2 represent the same product. As a result, the comparison unit 22 handles the product represented by the object 80-3 as a product that is included in the frame 60-2 but not included in the frame 60-1.

Figure 8A:
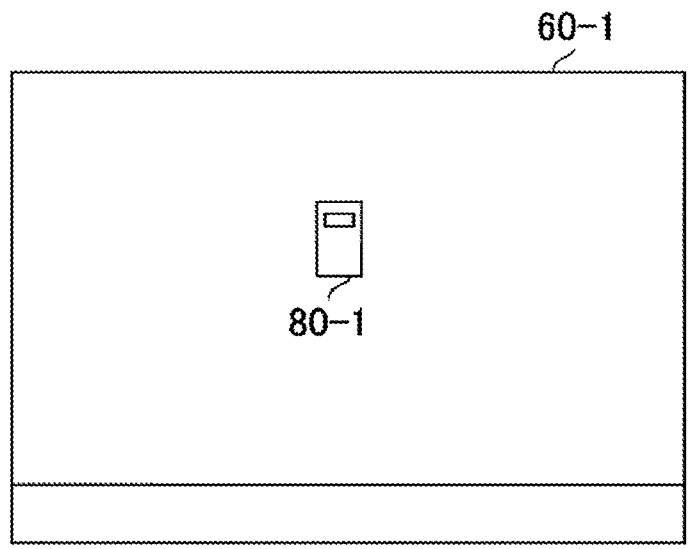
FIG. 8 is a diagram illustrating a scene in which a plurality of objects having a high similarity in feature value are included in one frame.
Figure 8B:
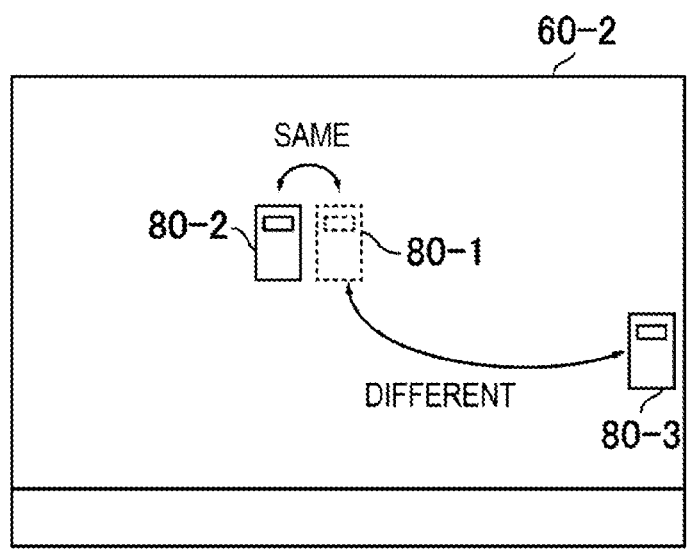

Here, there are cases where the user purchases a plurality of products of the same type. In this case, there are cases where a plurality of objects having a high similarity of feature values are included in the frame. FIG. 8 is a diagram illustrating a scene in which a plurality of objects having a high similarity in feature value are included in one frame. In FIG. 8, the object 80-1 is included in the frame 60-1, and the object 80-2 and the object 80-3 are included in the frame 60-2. Here, the object 80-1 and the object 80-2 represent the same product. In addition, the product represented by the object 80-3 is the product of the same type as the type of the product represented by the object 80-1 and the object 80-2. Therefore, the feature values respectively calculated for the object 80-1 to the object 80-3 have high degree of coincidence with each other.

In such a case, the comparison unit 22 determines the object 80 representing the same product, using the position of each object 80. Specifically, the comparison unit 22 handles the product represented by the object 80-2 having a short distance to the object 80-1 included in the frame 60-1 as the same product as the product represented by the object 80-1. On the other hand, the comparison unit 22 handles the product represented by the object 80-3 having a long distance to the object 80-1, as a product different from the product represented by the object 80-1 (a product newly imaged by the camera 30). That is, the comparison unit 22 handles the product represented by the object 80-3 as a product that is included in the frame 60-2 but not included in the frame 60-1.

«Method 2»

The comparison unit 22 may determine the identifier of the product (hereinafter referred to as a product identifier (ID)) included in the frame and distinguish the product using the product ID. For example, the product ID is stored in association with the image of the product in a product database that manages information on each product. First, the comparison unit 22 extracts an object from a frame in the same manner as the method described in Method 1. Then, the comparison unit 22 determines the product ID of the product represented by each object included in the frame, by matching the extracted object with the image of each product stored in the product database. By doing so, the comparison unit 22 distinguishes each product included in the frame according to the product ID of the product.

The method of determining the product ID is not limited to the above method. For example, the comparison unit 22 may determine the product ID of the product by analyzing various codes (barcode, QR code (registered trademark), or the like) attached to the product included in the frame.

Here, in a case where the same product ID is assigned to the same type of products, the comparison unit 22 cannot distinguish between products of the same type included in one frame by the product IDs. In this case, similar to the method described with reference to FIG. 8 in Method 1, the comparison unit 22 determines the object representing the same product, using the position of each object.

For example, in the example shown in FIG. 8, it is assumed that the same product ID is assigned to the product represented by the object 80-1 and the object 80-2 and the product represented by the object 80-3. In this case, the comparison unit 22 handles the product represented by the object 80-2 having a short distance to the object 80-1 included in the frame 60-1 as the same product as the product represented by the object 80-1. On the other hand, the comparison unit 22 handles the product represented by the object 80-3 having a long distance to the object 80-1, as a product different from the product represented by the object 80-1 (a product newly imaged by the camera 30).

<Which Frames are Handled as First Frame and Second Frame>

The comparison unit 22 handles two different frames included in the product video, as a first frame and a second frame. As described above, the second frame is a frame generated after the first frame. There are various methods for determining which frames are handled as the first frame and the second frame, among the frames included in the product video (which frames are to be subjected to the comparison process) by the comparison unit 22. FIG. 9 are diagrams illustrating a method of determining a frame to be processed. Here, in the case where the first frame is a frame a and the second frame is a frame b, a pair of the first frame and the second frame is expressed as P(a, b). a and b are frame numbers, respectively.

Figure 9A:
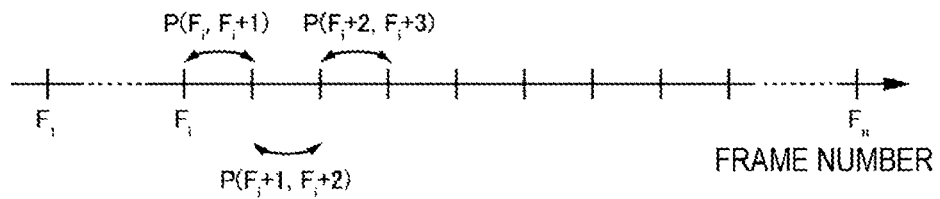
FIG. 9 are diagrams illustrating a method of determining a frame to be processed.

In FIG. 9A, the comparison unit 22 sets two consecutive frames in time series as a first frame and a second frame. That is, assuming that the frame number of the first frame is the pair of the first frame and the second frame is $P(F_i, F_i+1)$. Further, in FIG. 9A, the comparison unit 22 performs a comparison process on all the pairs $P(F_i, F_i+1)$ included in the frame $F_1$ to frame $F_n$ ($F_n > F_1$). Therefore, the next pair of $P(F_i, F_i+1)$ is $P(F_i+1, F_i+2)$. Note that, the method of determining the first frame $F_1$ and the last frame $F_n$ will be described later.

Figure 9B:
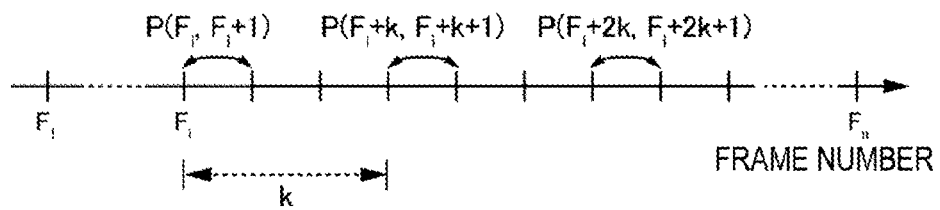

In FIG. 9B, similarly to FIG. 9A, $P(F_i, F_i+1)$ which is a pair of consecutive two frames in the time series is compared by the comparison unit 22. However, the comparison unit 22 selects each pair excluding a predetermined interval k. Therefore, the next pair of $P(F_i, F_i+1)$ is $P(F_n+k, F_n+k+1)$. The value of k can be set to any value. The information indicating k may be preset in the comparison unit 22 or may be stored in a storage unit accessible from the comparison unit 22.

Figure 9C:
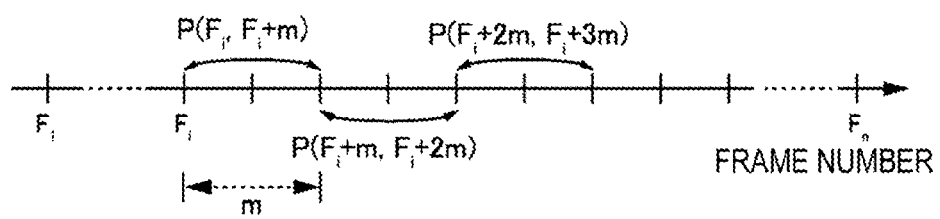

In FIG. 9C, the comparison unit 22 sets the frame later than the first frame by a predetermined number m as the second frame. That is, a pair of $P(F_i, F_i+m)$ is selected as the first frame and the second frame. Further, in FIG. 9C, the frame handled as the first frame by the comparison unit 22 is the frame handled as the second frame in the previous comparison process. Therefore, the next pair of $P(F_i, F_i+m)$ is $P(F_i+m, F_i+2m)$. The value of m can be set to any value. The information indicating k may be preset in the comparison unit 22 or may be stored in a storage unit accessible from the comparison unit 22.

Figure 9D:
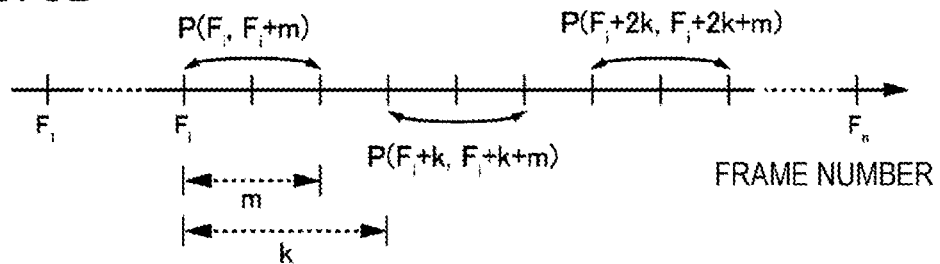

In FIG. 9D, as in the case of FIG. 9C, the comparison unit 22 sets the pair of $P(F_i, F_i+m)$ as the first frame and the second frame. However, in FIG. 9D, each pair is selected excluding a predetermined interval k (k>m). Therefore, the next pair of $P(F_i, F_i+m)$ is $P(F_i+k, F_i+k+m)$.

Information indicating which one of the methods described with reference to FIGS. 9A to 9D described above is used to determine the pair of the first frame and the second frame may be set in advance in the comparison unit 22, or may be stored in a storage apparatus accessible from the comparison unit 22. Further, the method of determining the pair of the first frame and the second frame is not limited to the above method.

«Method of Determining the Start Frame $F_1$ and the Last Frame $F_n$»

There are various methods of determining the start frame $F_1$ and the last frame $F_n$. For example, the comparison unit 22 sets the product video generated from the start of execution of the product registration apparatus 20 until the end of the execution of the product registration apparatus 20 as a target of a comparison process. In this case, $F_1$ is a frame generated when the execution of the product registration apparatus 20 is started, and $F_n$ is a frame generated immediately before the end of the execution of the product registration apparatus 20.

Further, for example, the comparison unit 22 sets the product video generated during the period from receiving the input operation instructing the start of the registration process of the payment target to receiving the input operation instructing the end of the registration process of the payment target as an object to be subject to the compare process. In this case, Ft is a frame generated at the timing of receiving the input operation instructing the start of the registration process of the payment target, and $F_n$ is a frame generated at the timing of receiving the input operation instructing the end of the registration process of the payment target. Here, the operation to instruct the start of the registration process of the payment target is an operation to press a button "start registration", for example. Further, the operation to instruct the end of the registration process of the payment target is an operation to press a button "subtotal", for example.

In this way, since the number of frames to be subjected to the comparison process can be reduced by setting only the product video generated during the period from the start to the end of the registration process of the payment target as the target of the comparison process, the amount of computer resources used by the product registration apparatus 20 is reduced.

<Regarding Product Registration>

The registration unit 24 registers a product that is not included in the first frame, among the products included in the second frame, as a payment target (S104). For example, the registration unit 24 generates payment information on the product to be registered as a payment target and registers the product as a payment target. The payment information is information on the payment process of a product registered as a payment target. For example, the registration unit 24 stores the generated payment information in a storage unit inside or outside the product registration apparatus 20.

The payment target for one payment process may include a plurality of products. For example, the product registration apparatus 20 registers one or a plurality of products which are registered during a period after receiving an input operation instructing the start of the registration process of a payment target until receiving an input operation instructing the end of the registration process of a payment target, as the payment target in one payment process.

The payment information representing the payment target for one payment process indicates the ID or the like of each product registered as a payment target. Further, the payment information may further indicate the number of products registered as payment targets, a transaction number, price of each product, a payment amount of money, or the like.

FIG. 10 is a diagram illustrating payment information in a table format. The payment information shown in FIG. 10 is referred to as payment information 300. The payment information 300 has two columns, Payment information ID 302 and Product list 304. Product list 304 is a list of product IDs registered as the payment targets. Product ID 306 is the ID of the product registered as a payment target.

Note that, since a variety of known techniques can be used for a specific method of generating payment information for the product being a payment target, a description of this method will not be repeated.

<Regarding Determination of Product ID>

The product registration apparatus 20 determines the product ID of the product to be registered as a payment target, using the product video. Here, the timing at which the product registration apparatus 20 determines the product ID of the product included in the product image varies. For example, as described above, the comparison unit 22 determines the product ID of each product from the frame to be compared. Then, the registration unit 24 uses the ID of the product determined by the comparison unit 22. Further, in a case where the comparison unit 22 does not use the product ID in the comparison between the frames, for example, the registration unit 24 determines the product ID of the product when registering the product as the payment target. The method of determining the product ID of the product by using the product video is as described above.

<Regarding Product Registration Apparatus 20>

The product registration apparatus 20 may be an apparatus operated by a store clerk or may be an apparatus operated by a customer. In the latter case, the customer herself causes the product registration apparatus 20 to perform the product registration process.

The product registration apparatus 20 may or may not have a function of performing a payment process of the product registered as a payment target. For example, the payment process includes a process of presenting to the customer, a payment amount indicated in the payment information, a process of receiving customer's payment, a process of counting up the paid-in money, a process of discharging change to the customer, a process of issuing a receipt, or the like. In a case where the product registration apparatus 20 does not have the function of performing the payment process, an apparatus having a function of performing the payment process is installed separately in the store.

Another Operation Example

Figure 11:
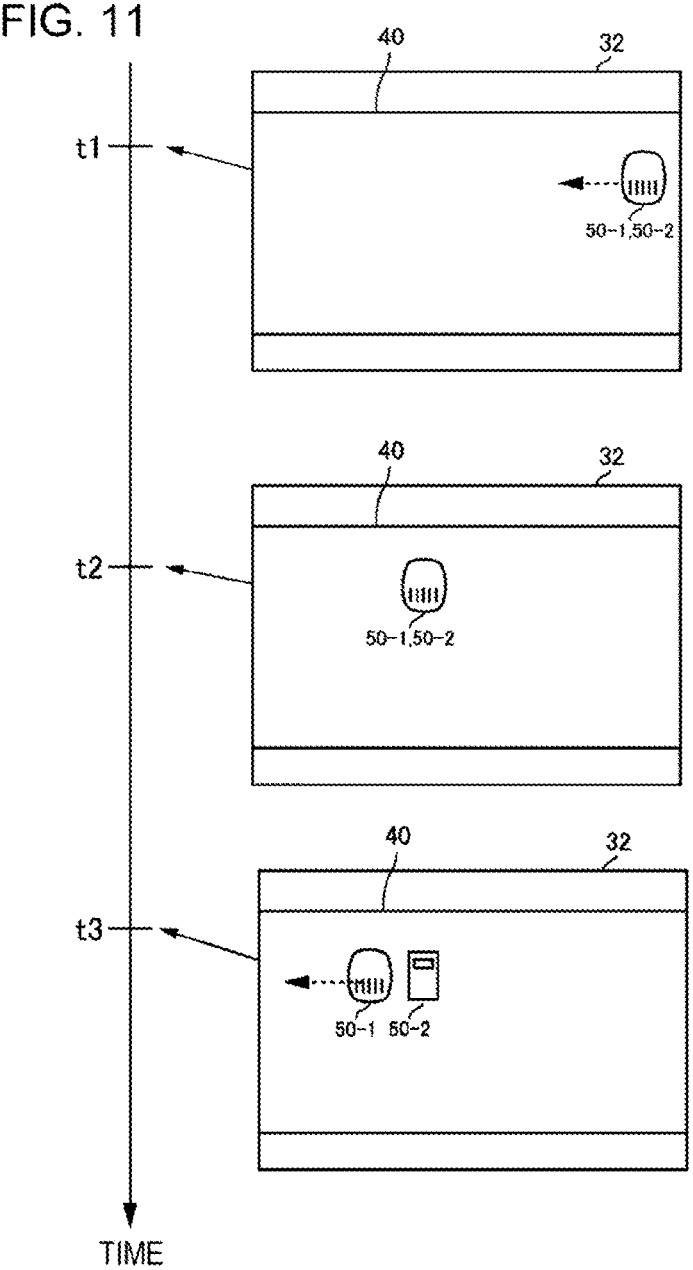
FIG. 11 is a diagram illustrating a case in which two products are stacked and placed on a placement table.

Another operation example of the product registration apparatus 20 of Example Embodiment 1 will be further described. In this operation example, the user stacks and places a plurality of products 50 on the placement table 40. FIG. 11 is a diagram illustrating a case in which two products are stacked and placed on the placement table 40. In this case, first, the comparison unit 22 performs the comparison process, with the frame before the product 50-1 stacked on the product 50-2 is included as the first frame, and the frame after the product 50-1 stacked on the product 50-2 is included as the second frame. As a result, the comparison unit 22 determines that the product 50-1 is a product that is included in the second frame but is not included in the first frame. Therefore, the registration unit 24 registers the product 50-1 as a payment target. Here, since the product 50-2 is hidden behind the product 50-1 and is not included in the product image 32, it is not registered as a payment target at this timing.

Thereafter, the user places the stacked product 50-1 and the product 50-2 on the placement table 40. Then, the user moves the product 50-1 on the product 50-2. Thus, the subsequent product video 32 includes the product 50-2. Therefore, the comparison unit 22 performs a comparison process, with the frame before the product 50-2 is included as the first frame and the frame after the product 50-2 is included as the second frame. As a result, the comparison unit 22 determines that the product 50-2 is a product that is included in the second frame but is not included in the first frame. Therefore, the registration unit 24 registers the product 50-2 as a payment target.

According to the example shown in FIG. 11, if the user stacks and places a plurality of products 50 on the placement table 40, and then moves the products in order from the upper product, each product 50 can be registered as a payment target. Therefore, since it is possible to place a plurality of products 50 on the placement table 40 at a time, the labor for moving the products 50 is reduced.

Example Embodiment 2

A product registration apparatus 20 according to Example Embodiment 2 has the configuration shown in FIG. 1, similar to the product registration apparatus 20 of Example Embodiment 1. Except as described below, the product registration apparatus 20 of Example Embodiment 2 has the same functions of the product registration apparatus 20 of Example Embodiment 1.

The product registration apparatus 20 of Example Embodiment 2 operates such that a product is not erroneously registered twice as a payment target, in a case or the like where the product is not temporarily captured by the camera 30. This will be specifically described below.

Figure 12:
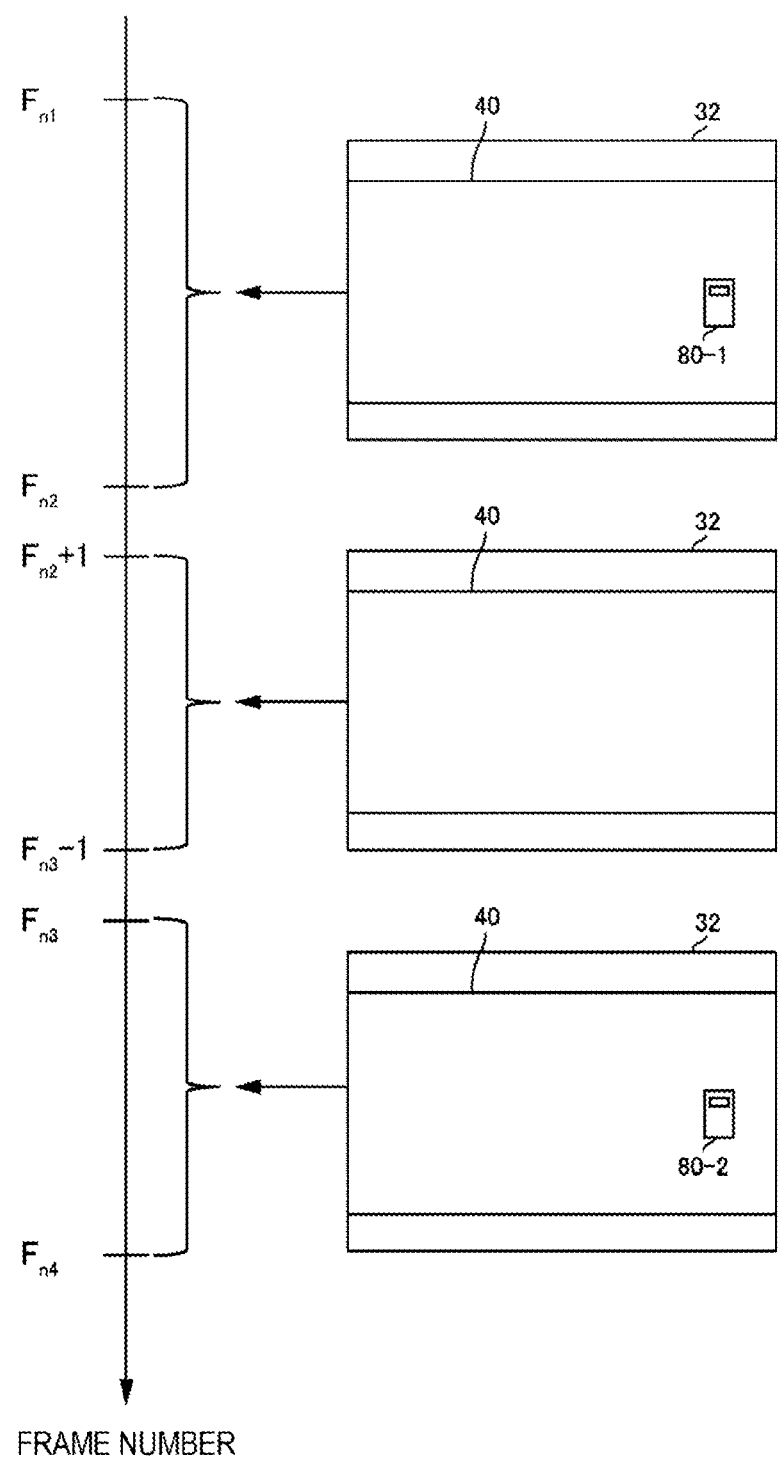
FIG. 12 is a diagram for explaining an operation of a product registration apparatus of Example Embodiment 2.

FIG. 12 is a diagram for explaining an operation of a product registration apparatus 20 of Example Embodiment 2. Hereinafter, the video configured with the frame a to frame b of the product video 32 is represented as a partial video V(a, b). In FIG. 12, the object 80-1 is extracted from the partial video $V(F_{n1}, F_{n2})$. Further, the object 80-2 is extracted from the partial video $V(F_{n3}, F_{n4})$. Here, the product represented by the object 80-1 and the product represented by the object 80-2 are the same type of products. Both the object 80-1 and the object 80-2 are not extracted from the partial video $V(F_{n2}+1, F_{n3}-1)$.

Figure 13:
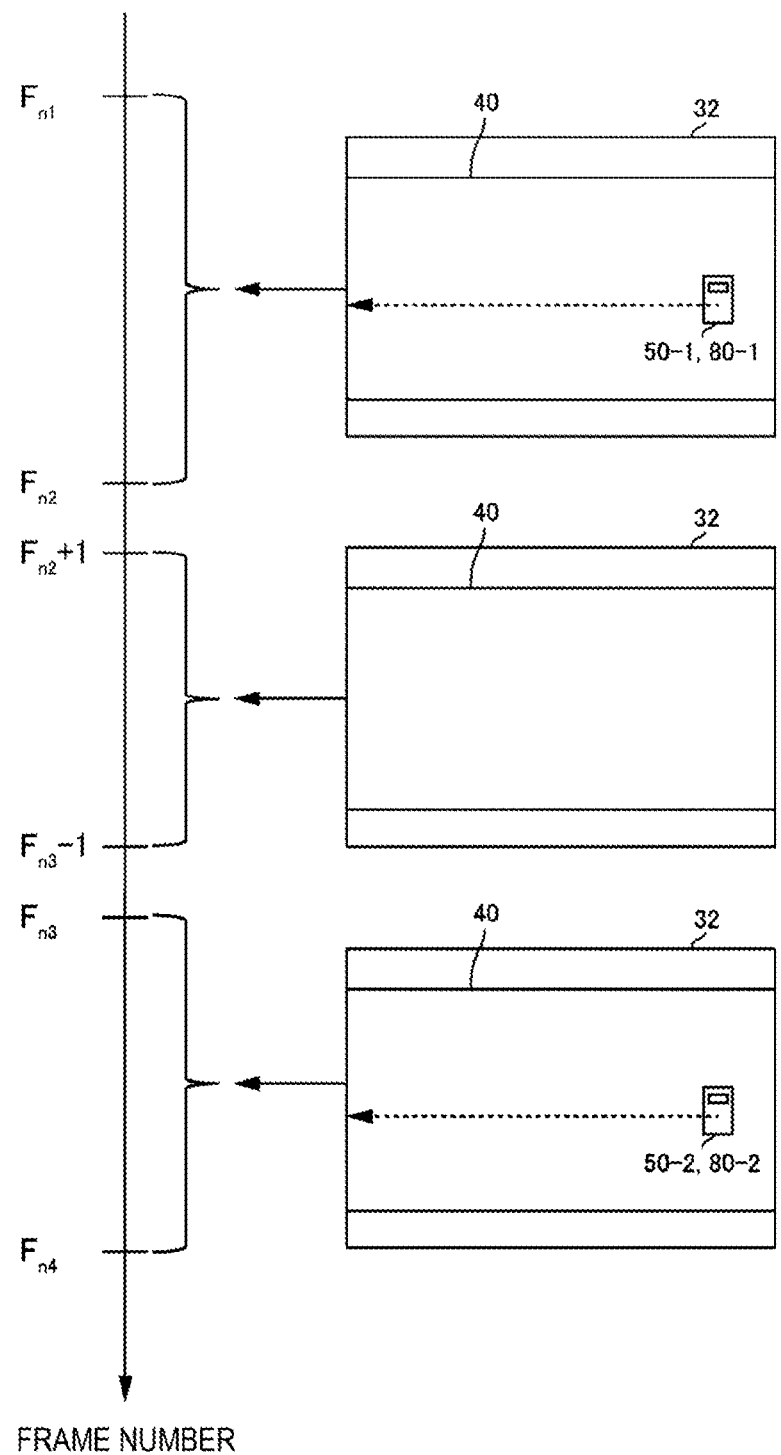
FIG. 13 is a diagram illustrating a case where products represented by two objects are different products.

In the example of FIG. 12, there are two cases of 1) a case where the product represented by the object 80-1 and the product represented by the object 80-2 are different products, and 2) a case where the product represented by the object 80-1 and the product represented by the object 80-2 are the same products. FIG. 13 is a diagram illustrating a case where the product represented by the object 80-1 and the product represented by the object 80-2 are different products. On the other hand, FIG. 14 is a diagram illustrating a case where the product represented by the object 80-1 and the product represented by the object 80-2 are the same products.

In the example of FIG. 13, the user first takes out the product 50-1 from the shopping basket and passes the product 50-1 on the placement table 40. Therefore, the object 80-1 representing the product 50-1 is extracted from the partial video $V(F_{n1}, F_{n2})$. After a while, the user takes out the product 50-2 from the shopping basket and passes the product 50-2 on the placement table 40. Therefore, the object 80-2 representing the product 50-2 is extracted from the partial video $V(F_{n3}, F_{n4})$. Further, both the object 80-1 and the object 80-2 are not extracted from the partial video $V(F_{n2}+1, F_{n3}-1)$. In this case, the registration unit 24 needs to register both the product 50-1 represented by the object 80-1 and the product 50-2 represented by the object 80-2, as payment targets.

In the example of FIG. 14, the user first takes out the product 50-1 from the shopping basket and places it on the placement table 40. Therefore, the object 80-1 representing the product 50-1 is extracted from the partial video $V(F_{n1}, F_{n2})$. Thereafter, while the partial video $V(F_{n2}+1, F_{n3}-1)$ is generated, the user's hand 90 is in the imaging range of the camera 30 so as to cover the product 50-1. Therefore, during this time, product 50-1 is not included in the product video 32. Thereafter, the user's hand 90 is no longer included in the product video 32, and the product 50-1 is again included in the product video 32. Therefore, the object 80-2 representing the product 50-1 is extracted from the partial video $V(F_{n3}, F_{n4})$. Therefore, the object representing the product 50-1 is not extracted from the partial video $V(F_{2n}+1, F_{3n}-1)$. In this case, the registration unit 24 should recognize that the product represented by the object 80-1 and the product represented by the object 80-2 are the same product and should register the product 50-1 as a payment target. If the registration unit 24 individually registers the product represented by the object 80-1 and the product represented by the object 80-2, one product is mistakenly registered twice as a payment target (so-called double reading occurs).

Therefore, the product registration apparatus 20 of Example Embodiment 2 operates as follows. First, in a case where there is a product that is included in the second frame but not included in the first frame, the comparison unit 22 determines whether or not there is a frame including a product of the same type as the type of the product in a frame sequence between a frame prior to the second frame by a predetermined number and the previous frame of the second frame. If there is a frame including a product of the same type as the type of the product in the frame sequence, the registration unit 24 does not register the product as a payment target. On the other hand, if there is no frame including a product of the same type as the type of the product in the frame sequence, the registration unit 24 registers the product as a payment target.

For example, in the example of FIG. 12, it is assumed that the comparison unit 22 performs the comparison process, with the frame Fan as the second frame and the frame $F_{3n}-1$ as the first frame. In this case, it is determined that the product represented by the object 80-2 is a product that is included in the second frame but not included in the first frame. Therefore, the comparison unit 22 determines whether or not a product of the same type as the type of the product represented by the object 80-2 is included in a frame sequence from a frame prior to the frame $F_{3n}$ by a predetermined number to the frame $F_{3n}-1$.

Here, if the predetermined number is equal to or larger than $F_{3n}-F_{2n}$, the frame sequence includes frames before frame Fen. Therefore, in the frame sequence, there is a frame from which the object 80-1 is extracted. Then, the product represented by the object 80-1 and the product represented by the object 80-2 are the same type of products. Therefore, the registration unit 24 does not register the product represented by the object 80-2 extracted from the frame Fan as a payment target.

On the other hand, if the predetermined number is less than $F_{3n}-F_{2n}$, the frame sequence does not include frames before frame Fen. Therefore, in the frame sequence, there is no frame including the same product as the product represented by the object 80-2. Therefore, the registration unit 24 registers the product represented by the object 80-2 included in the frame Fan as a payment target.

The above-described process focuses on a difference between the length of time in which a certain product is not temporarily included in the product video 32 as illustrated in FIG. 14 (the length of a partial video V($F_{n2}$+1, $F_{n3}$−1) as in FIG. 14) and the length of time in which different products of the same type are not included in the product video 32 in a case where each of those products is registered as illustrated in FIG. 13 (the length of a partial video V($F_{n2}$+1, $F_{n3}$−1) in FIG. 13). Generally, it is considered that the length of time in which a certain product is not temporarily included in the product video 32 as in FIG. 14 is shorter than the time from registering the first product to registering the next product in the case of registering two different products as a payment target.

Thus, in a case where a product of the same type as the type of the product that is included in the second frame but not included in the first frame is included in a frame sequence between a frame prior to the second frame by a predetermined number and the previous frame of the second frame, the comparison unit 22 registers the product as a payment target. By doing so, the product registration apparatus 20 of Example Embodiment 2 prevents a product that is not temporarily included in the product video 32 from being registered twice as a payment target by mistake, and accurately recognizes the number of products registered as a payment target.

Note that, the predetermined number can be set to any number. The predetermined number may be preset in the comparison unit 22 or may be stored in a storage apparatus accessible from the comparison unit 22. Instead of the predetermined number, a predetermined time may be set. In this case, the comparison unit 22 calculates the predetermined number by calculating the product of the frame rate of the product video 32 and the predetermined time.

Further, in the above-described process, the comparison unit 22 uses "a frame sequence between a frame prior to the second frame by a predetermined number and the previous frame of the second frame", but the end of this frame sequence is not necessarily limited to a frame immediately before the second frame. For example, the comparison unit 22 may use "a frame sequence between a frame prior to the second frame by a first predetermined number and a frame prior to the second frame by a second predetermined number". Here, the first predetermined number is larger than the second predetermined number. The first predetermined number and the second predetermined number can be set to any number.

<Flow of Process>

FIG. 15 is a flowchart illustrating the flow of a process executed by the product registration apparatus 20 of example embodiment 2. First, the comparison unit 22 determines whether or not there is a product that is not included in the first frame, among the products included in the second frame (S202). In a case where there is a product that is not included in the first frame, among the products included in the second frame (S202: YES), the process of FIG. 15 proceeds to S204. On the other hand, if there is no product that is not included in the first frame, among the products included in the second frame (S202: NO), the process of FIG. 15 ends.

In S204, the comparison unit 22 determines whether or not there is a frame including a product of the same type as the type of the product (hereinafter referred to as "corresponding product") included in the second frame but not included in the first frame, in a frame sequence from a frame prior to the second frame by a predetermined number to a frame immediately before the second frame. In a case where there is a frame including a product of the same type as the type of the product in the frame sequence (S202: YES), the process of FIG. 15 ends. In a case where there is no frame including a product of the same type as the type of the product in the frame sequence (S202: NO), the process of FIG. 15 proceeds to S206. In S206, the registration unit 24 registers the product as a payment target.

<Example of Hardware Configuration>

The product registration apparatus 20 of the second embodiment is realized by using the computer 200 as in the first embodiment (see FIG. 2). In the present example embodiment, each program module stored in the storage 208 described above further includes a program for realizing each function described in the present example embodiment.

Although the example embodiments of the present invention have been described above with reference to the drawings, these are examples of the present invention, and it is possible to use various configurations other than the above example embodiments.

All or some of the above example embodiments may be listed also in the following notes, but not limited thereto.

1. An information processing apparatus including a comparison unit which compares a first frame of a video with a second frame which to determine a product that is not included in the first frame but included in the second frame, the second frame being generated at a time later than the first frame in the video; and a registration unit which registers the determined product as a payment target.

2. The information processing apparatus according to 1., wherein the comparison unit extracts objects from the first frame and the second frame respectively, and sets a product represented by an object having low similarity with each object extracted from the first frame, among the objects extracted from the second frame, as a product that is not included in the first frame but included in the second frame.

3. The information processing apparatus according to 1., the comparison unit extracts objects from the first frame and the second frame respectively, determines an identifier of a product represented by each extracted object, by using information in which an image and an identifier of a product are associated with each other, and determines the product that is not included in the first frame but included in the second frame, by comparing an identifier of each product included in the first frame with an identifier of each product included in the second frame.

4. The information processing apparatus according to any one of 1. to 3, wherein in a case where a product of the same type as the type of the product not included in the first frame but included in the second frame is included in a frame sequence between a frame prior to the second frame by a predetermined number and a previous frame of the second frame, the registration unit does not register the product that is not included in the first frame but included in the second frame as a payment target.

5. The information processing apparatus according to any one of 1. to 4, wherein a camera images a table on which a product of a payment target is placed from above, the camera generating the video.

6. A control method executed by a computer, comprising:

a comparison step of comparing a first frame of a video with a second frame to determine a product that is not included in the first frame but included in the second frame, the second frame being generated at a time later than the first frame in the video; and a registration step of registering the determined product as a payment target.

7. The control method according to 6, wherein in the comparison step, objects are extracted from the first frame and the second frame respectively, and a product represented by an object having low similarity with each object extracted from the first frame, among the objects extracted from the second frame, is set as a product that is not included in the first frame but included in the second frame.

8. The control method according to 6, wherein in the comparison step, objects are extracted from the first frame and the second frame respectively, an identifier of a product represented by each extracted object is determined by using information in which an image and an identifier of a product are associated with each other, and the product that is not included in the first frame but included in the second frame is determined by comparing an identifier of each product included in the first frame with an identifier of each product included in the second frame.

9. The control method according to any one of 6. to 8, wherein in the registration step, in a case where a product of the same type as the type of the product not included in the first frame but included in the second frame is included in a frame sequence between a frame prior to the second frame by a predetermined number and a previous frame of the second frame, the product that is not included in the first frame but included in the second frame is not registered as a payment target.

10. The control method according to any one of 6. to 9, wherein a camera images a table on which a product being a payment target is placed from above which generates the video captures.

11. A program that causes a computer to execute each step of the control method according to any one of 6. to 10.

This application claims priority based on Japanese Patent Application No. 2016-009749 filed on Jan. 21, 2016, and the disclosure of which is incorporated herein in its entirety.

The invention claimed is:

1. An information processing apparatus for a point-of-sales system comprising:

at least one memory configured to store instructions; and
at least one processor configured to perform the instructions to:
determine a first product that is not included in a first frame of a video but included in a second frame of the video, by comparing the first frame with the second frame, the second frame being generated at a time later than the first frame in the video, the video including an image of the product; and
register the first product as a payment target;
wherein in the registration, if a second product is included in a frame sequence between a frame prior to the second frame by a predetermined number and a previous frame of the second frame, the second product being the same type as the type of the first product, not to register the first product as a payment target.

2. The information processing apparatus according to claim 1, wherein the processor is further configured to:
extract a first object from the first frame;
extract a second object from the second frame;
calculate a similarity between the extracted first object and the extracted second object by comparing the extracted first object and the extracted second object; and
determine the product that is not included in the first frame but included in the second frame, based on the calculated similarity.

3. The information processing apparatus according to claim 1, wherein the processor is further configured to:
extract objects from the first frame and the second frame respectively;
determine an identifier of a product corresponding to each extracted object, by using information in which an image and an identifier of a product are associated with each other; and
determine the product that is not included in the first frame but included in the second frame, by comparing an identifier of each product included in the first frame with an identifier of each product included in the second frame.

4. The information processing apparatus according to claim 1, wherein the processor is further configured to register the first product only when the first second product is not included in the frame sequence.

5. The information processing apparatus according to claim 1, the processor is further configured to multiply a frame rate of the video by a predetermined time, and set a result value of the multiplication as the predetermined number.

6. A control method executed by a computer, comprising:
comparing a first frame of a video with a second frame to determine a first product that is not included in the first frame but is included in the second frame, the second frame being generated at a time later than the first frame in the video; and
registering the first product as a payment target;
wherein in the registration, in a case where a second product of the same type as the type of the first product is included in a frame sequence between a frame prior to the second frame by a predetermined number and a previous frame of the second frame, not registering the first product as a payment target.

7. The control method according to claim 6, wherein in the comparison:
extracting objects from the first frame and the second frame respectively; and
setting a product represented by an object having low similarity with each object extracted from the first frame, among the objects extracted from the second frame, as the first product that is not included in the first frame but included in the second frame.

8. The control method according to claim 6, wherein in the comparison:
extracting objects from the first frame and the second frame respectively;
determining an identifier of a product represented by each extracted object by using information in which an image and an identifier of a product are associated with each other; and
determining the product that is not included in the first frame but included in the second frame by comparing an identifier of each product included in the first frame with an identifier of each product included in the second frame.

9. The control method according to claim 6, wherein a camera images a table on which a product being a payment target is placed from above, the camera generating the video.

10. A non-transitory computer-readable storage medium storing a program that causes a computer to execute each step of the control method according to claim 6.

11. A point-of-sales system comprising:

a camera configured to generate a video, the camera capturing a placement table and being installed at a position from which the placement table is looked down; and a product registration apparatus including:

at least one memory configured to store instructions; and at least one processor configured to perform the instructions to:

determine a first product that is not included in a first frame of a video but included in a second frame of the video, by comparing the first frame with the second frame, the second frame being generated at a time later than the first frame in the video, the video including an image of the product; and register the first product as a payment target, wherein the product captured by the camera is placed on the placement table;

wherein in the registration, if a second product is included in a frame sequence between a frame prior to the second frame by a predetermined number and a previous frame of the second frame, the second product being the same type as the type of the first product, not to register the first product as a payment target.

12. The point-of-sales system according to claim 11, wherein the camera starts capturing when a first button is pressed, the press of the first button indicating starting a registration process of payment targets, and the camera ends capturing when a second button is pressed, the press of the second button indicating ending a registration process of payment targets.

13. The point-of-sales system according to claim 11, wherein the camera and the product registration apparatus is communicably connected with each other.

* * * * *